US008290284B2

(12) United States Patent
Fujita

(10) Patent No.: US 8,290,284 B2
(45) Date of Patent: Oct. 16, 2012

(54) ERROR DETERMINATION DEVICE AND ERROR DETERMINATION METHOD

(75) Inventor: Shin Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 252 days.

(21) Appl. No.: 12/659,981

(22) Filed: Mar. 26, 2010

(65) Prior Publication Data

US 2010/0260440 A1      Oct. 14, 2010

Related U.S. Application Data

(63) Continuation of application No. PCT/JP2007/069074, filed on Sep. 28, 2007.

(51) Int. Cl.
*G06K 9/36* (2006.01)
(52) U.S. Cl. ........................................................ 382/232
(58) Field of Classification Search .................. 382/253, 382/232, 233, 240, 241, 242, 243, 245, 118, 382/190, 305; 348/14, 15, 17, 19; 392/500
See application file for complete search history.

(56) References Cited

U.S. PATENT DOCUMENTS

| | | | | |
|---|---|---|---|---|
| 5,894,333 | A * | 4/1999 | Kanda et al. | 348/597 |
| 6,738,559 | B1 * | 5/2004 | Yoo et al. | 386/231 |
| 7,017,102 | B1 * | 3/2006 | Kristensson et al. | 714/786 |
| 7,023,926 | B2 | 4/2006 | Matsuura et al. | |
| 7,376,880 | B2 * | 5/2008 | Ichiki et al. | 714/751 |
| 7,636,298 | B2 * | 12/2009 | Miura et al. | 370/216 |
| 7,710,461 | B2 * | 5/2010 | Nagano et al. | 348/208.99 |
| 7,738,037 | B2 * | 6/2010 | Tang et al. | 348/441 |
| 7,751,691 | B2 * | 7/2010 | Yatomi | 386/329 |
| 7,849,384 | B2 * | 12/2010 | Costa et al. | 714/776 |
| 7,936,818 | B2 * | 5/2011 | Jayant et al. | 375/240.05 |
| 2002/0181459 | A1 | 12/2002 | Ohta et al. | |
| 2004/0153716 | A1 | 8/2004 | Baker | |
| 2005/0111371 | A1 * | 5/2005 | Miura et al. | 370/242 |
| 2008/0279272 | A1 * | 11/2008 | Saito et al. | 375/240.01 |

FOREIGN PATENT DOCUMENTS

| | | |
|---|---|---|
| JP | 2002-281445 | 9/2002 |
| JP | 2002-359603 | 12/2002 |
| JP | 2003-060652 | 2/2003 |
| JP | 2003-519448 | 6/2003 |
| JP | 2004-128870 | 4/2004 |
| JP | 2005-159433 | 6/2005 |
| JP | 2006-254298 | 9/2006 |

OTHER PUBLICATIONS

International Search Report issued on Nov. 13, 2007 in corresponding PCT Application No. PCT/JP2007/069074.

* cited by examiner

*Primary Examiner* — Vu Le
*Assistant Examiner* — Andrae S Allison
(74) *Attorney, Agent, or Firm* — Staas & Halsey LLP

(57) ABSTRACT

A processing-coefficient decision unit decides a processing coefficient based on a format of the stream. A target-PTS decision unit multiplies an input PTS value by the processing coefficient, to set this as a target PTS used to determine the continuity of the pictures. A reference-PTS calculation unit sets the target PTS as an initial value of a reference PTS, sequentially adds an increment corresponding to the PTS value per picture, and calculates the reference PTS which is compared with the target PTS. A difference calculation unit calculates a difference between the target PTS and the reference PTS. A threshold determination unit compares an absolute value of the difference with the processing coefficient being a threshold and determines whether the absolute value of the difference is less than the processing coefficient.

12 Claims, 9 Drawing Sheets

FIG.3

| FORMAT | num_units_in_tick | time_scale |
|---|---|---|
| 59.94 Hz: INTERLACE | 1001 | 60000 |
| 50 Hz: INTERLACE | 1 | 50 |
| 59.94 Hz: PROGRESSIVE | 1001 | 120000 |
| 50 Hz: PROGRESSIVE | 1 | 100 |

FIG.4

| FORMAT | PTS VALUE PER PICTURE |
|---|---|
| 59.94 Hz: INTERLACE | 3003 |
| 50 Hz: INTERLACE | 3600 |
| 59.94 Hz: PROGRESSIVE | 1501.5 |
| 50 Hz: PROGRESSIVE | 1800 |

FIG.6

| PICTURE | PICTURE #1 | PICTURE #2 | PICTURE #3 | PICTURE #4 | PICTURE #5 |
|---|---|---|---|---|---|
| PTS VALUE | 10000 | 50000 | 51501 | 53003 | 54504 |
| TARGET PTS | 20000 | 100000 | 103002 | 106006 | 109008 |
| REFERENCE PTS | 20000 | 23003→100000 | 103003 | 106006 | 109009 |
| DIFFERENCE | 0 | 76997 | -1 | 0 | -1 |
| DETERMINATION RESULT | NO ERROR | ERROR | NO ERROR | NO ERROR | NO ERROR |

FIG.10

| PICTURE | PICTURE #1 | PICTURE #2 | PICTURE #3 | PICTURE #4 | PICTURE #5 |
|---|---|---|---|---|---|
| PTS VALUE | 10000 | 50000→11501 | 13003 | 14504 | 16006 |
| TARGET PTS | 20000 | 100000 | 26006 | 29008 | 32012 |
| PRECEDENT PTS | 8498 | 10000 | 11501 | 13003 | 14504 |
| REFERENCE PTS | 20000 | 23003 | 26006 | 29009 | 32012 |
| DIFFERENCE | 0 | 76997 | 0 | -1 | 0 |
| THRESHOLD DETERMINATION | NO ERROR | ERROR | NO ERROR | NO ERROR | NO ERROR |
| PROTECTION DETERMINATION | NO ERROR | NO ERROR | NO ERROR | NO ERROR | NO ERROR |

FIG.11

| PICTURE | PICTURE #1 | PICTURE #2 | PICTURE #3 | PICTURE #4 | PICTURE #5 |
|---|---|---|---|---|---|
| PTS VALUE | 10000 | 50000→11501 | 51501 | 53003 | 54504 |
| TARGET PTS | 20000 | 100000 | 103002 | 106006 | 109008 |
| PRECEDENT PTS | 8498 | 10000 | 50000 | 51501 | 53003 |
| REFERENCE PTS | 20000 | 23003 | 26006→103002 | 106005 | 109008 |
| DIFFERENCE | 0 | 76997 | 76996 | 1 | 0 |
| THRESHOLD DETERMINATION | NO ERROR | ERROR | ERROR | NO ERROR | NO ERROR |
| PROTECTION DETERMINATION | NO ERROR | NO ERROR | ERROR | NO ERROR | NO ERROR |

ERROR DETERMINATION DEVICE AND ERROR DETERMINATION METHOD

CROSS-REFERENCE TO RELATED APPLICATION

This application is a continuation of International Application No. PCT/JP2007/069074, filed on Sep. 28, 2007, the entire contents of which are incorporated herein by reference.

FIELD

The embodiments discussed herein are directed to an error determination device and an error determination method for determining whether there is an error in a moving image composed of a plurality of pictures each to which time information indicating a display time is added.

BACKGROUND

Recently, a technology for digital signal processing related to moving images are remarkably progressing, and in association with this, system development aimed at realizing digital broadcasting and broadcasting-communication integration is being pursued in many countries in the world. Particularly, as service for communicating moving image data, data transfer service over the Internet using a stream distribution system is increasing. In the stream distribution system, it is general to reproduce the data received by a reception side in real time. A system using this type of system includes, for example, VOD (Video on Demand) and a streaming distribution of live images. Image distribution service over a broad and wide variety of networks such as the Internet is also rapidly developing. These image distributions are in many cases stream distribution using a compression technology such as MPEG (Moving Picture Experts Group) and H.264.

In this type of image distribution, an encoder device in a transmission side captures a moving image, compression-encodes images (hereinafter, "pictures") composing the moving image using MPEG or H.264, stores an obtained stream in an IP (Internet Protocol) packet, and transmits the packet. Added to the stream is PTS (Presentation Time Stamp) indicating a time at which each picture in the stream is captured. The PTS corresponding to each picture is calculated by adding a maximum value of delays in encoding to STC (System Time Clock) being a reference time of the system. Therefore, when the moving image is to be reproduced from the stream, a picture corresponding to the PTS is displayed at the same timing as a time indicated by each of the PTSs, and a moving image the same as the moving image before being encoded can thereby be reproduced.

Moreover, not only images but also audio data may be multiplexed on the stream transmitted from the encoder device. The audio data is compression-encoded by a system such as MPEG-1 layer 2 or AAC (Advanced Audio Coding).

Meanwhile, a decoder device for receiving the transmitted stream uses PCR (Program Clock Reference) and SCR (System Clock Reference) contained in the received stream, to reproduce the STC in the encoder device on the transmission side. The decoder device decodes the stream to be converted into a plurality of pictures, outputs the respective pictures each at a timing at which the reproduced STC coincides with the PTS of each picture, and causes a display device such as a display to display the moving image.

Incidentally, a packet error or the like may occur over a communication line in a real-time transmission system such as the image distribution, and thus, it is quite important to provide a mechanism for detecting or correcting an error in the system. As a method of dealing with the packet error, there is a method, disclosed in Japanese Laid-open Patent Publication No. 2005-159433, of using FEC (Forward Error Correction) and ARQ (Automatic Repeat reQuest) or the like. This method is an error detection and correction method for use when real-time data such as video and audio is transmitted over an IP network by using a protocol such as RTP (Real-time Transport Protocol) standardized by, for example, IETF (Internet Engineering Task Force). In other words, this is a technology used for an error such as loss of an IP packet occurring on the communication line.

However, a stream containing a plurality of pictures is stored in the IP packet to be transmitted upon image distribution, and only the detection and the correction of the error such as the loss of the IP packet may be insufficient. More specifically, even if the IP packet is received by the decoder device on the reception side without losing it on the communication line, an error may occur in the stream stored in the IP packet. If an error occurs in the stream, then the decoder device may not reproduce a correct moving image from the stream.

Therefore, there remains a problem that appropriate reproduction of the moving image from the stream stored in the IP packet may be failed only by error determination of the IP packet.

SUMMARY

According to an aspect of an embodiment of the invention, an error determination device is for determining whether there is an error in a moving image composed of a plurality of pictures each to which time information indicating a display time is added. The error determination device includes an acquisition unit for acquiring target time information for each picture corresponding to the display time indicated by the time information added to each of the pictures; a calculation unit for calculating reference time information for each picture corresponding to a normal display time that increases by a fixed display time per picture from an initial value; and a determination unit for determining whether a plurality of pictures are consecutive by comparing an absolute value of a difference between target time information and reference time information for each picture with a threshold.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram representing a specific example of a relationship between a format of a stream and a parameter;

FIG. 4 is a diagram representing a specific example of a relationship between the format of the stream and a display time per picture;

FIG. 6 is a diagram representing a specific example of the error determination process according to the first embodiment;

FIG. 10 is a diagram representing a specific example of the error determination process according to the second embodiment; and FIG. 11 is a diagram representing another specific example of the error determination process according to the second embodiment.

DESCRIPTION OF EMBODIMENT(S)

Preferred embodiments of the present invention will be explained with reference to accompanying drawings. The main point of the present invention is such that it is determined whether each PTS of consecutive pictures in a stream is increased by each increment of the PTS for one picture, and it is determined that there is no error in the stream when the PTS is increased by each increment of the PTS for one picture, while it is determined that there is an error in the stream when each PTS of the consecutive pictures is irregularly increased. Preferred embodiments of the present invention will be explained with reference to accompanying drawings.

[a] First Embodiment

Figure 1:
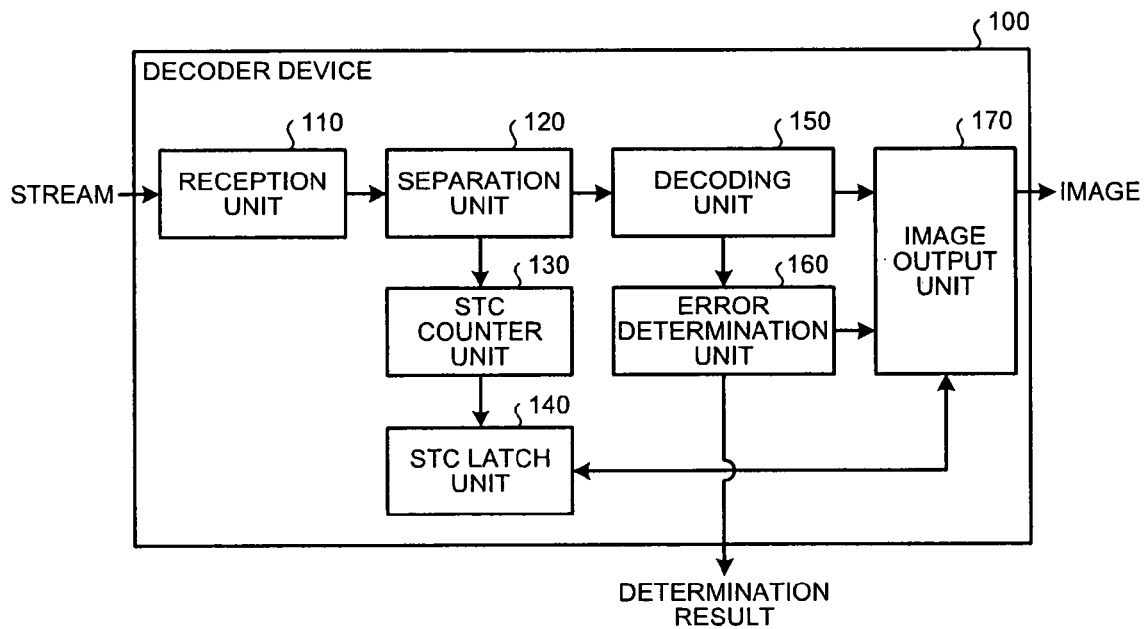
FIG. 1 is a block diagram representing a main configuration of a decoder device according to a first embodiment.

FIG. 1 is a block diagram representing a main configuration of a decoder device according to a first embodiment of the present invention. The decoder device represented in FIG. 1 includes a reception unit 110, a separation unit 120, an STC counter unit 130, an STC latch unit 140, a decoding unit 150, an error determination unit 160, and an image output unit 170.

The reception unit 110 receives a stream transmitted by an encoder device (not illustrated), and outputs the stream to the separation unit 120. The stream received by the reception unit 110 contains data for a moving image compression-encoded by the encoder device, and is received in a state of being stored in an IP packet, for example. At this time, a plurality of streams corresponding to a plurality of moving images may be stored in the IP packet.

The separation unit 120 separates reference time information such as PCR and SCR from the received stream, outputs the reference time information to the STC counter unit 130 and also outputs the stream containing data for the plurality of pictures to the decoding unit 150. Further, the separation unit 120, when the plurality of streams are stored in the IP packet, separates the streams from each other, acquires the reference time information from the respective streams, outputs the acquired reference time information to the STC counter unit 130, and separately outputs the respective streams to the decoding unit 150.

The STC counter unit 130 reproduces STC synchronized with the STC in the encoder device (not illustrated) from the reference time information such as PCR and SCR. Thus, the STC counter unit 130 counts a reference time that coincides with the encoder device that generates the stream from the moving image.

The STC latch unit 140, when VSYNC (Vertical SYN-Chronizing signal) for vertical synchronization is output from the image output unit 170, latches the STC counted by the STC counter unit 130, and sends the STC back to the image output unit 170. In other words, the STC latch unit 140 latches the reference time at a timing at which the image output unit 170 outputs the picture for displaying the moving image, and notifies the image output unit 170 of the latch.

The decoding unit 150 decodes the stream output from the separation unit 120, and outputs obtained individual pictures to the image output unit 170. Furthermore, the decoding unit 150 outputs PTS values added to the individual pictures to the error determination unit 160. Each of the PTS values added to the individual pictures indicates a time at which the picture is captured in the encoder device (not illustrated).

The error determination unit 160 determines whether each of the PTS values of the individual pictures input from the decoding unit 150 increases by each increment of the PTS for one picture, and thereby determines whether there is an error that the continuity of the pictures in the stream is lost. More specifically, the error determination unit 160 determines whether each of the PTS values of the consecutive pictures in the stream increases by each increment of the PTS for one picture according to the format of the moving image. The error determination unit 160 then outputs the result of determination as to whether there is an error and also outputs a PTS value for output indicating an output timing for each picture to the image output unit 170. The internal configuration and operation of the error determination unit 160 will be explained in detail later.

The image output unit 170 temporarily stores the obtained picture decoded by the decoding unit 150 in an internal buffer, and outputs the picture at a timing at which the PTS value for output which is output from the error determination unit 160 corresponding to the picture and the STC notified from the STC latch unit 140 as a response to VSYNC coincide with each other. In this manner, the image output unit 170 sequentially outputs the pictures based on the PTSs indicating each time at which the individual pictures are captured, to cause the moving image to be displayed on the display device such as a display (not illustrated).

Figure 2:
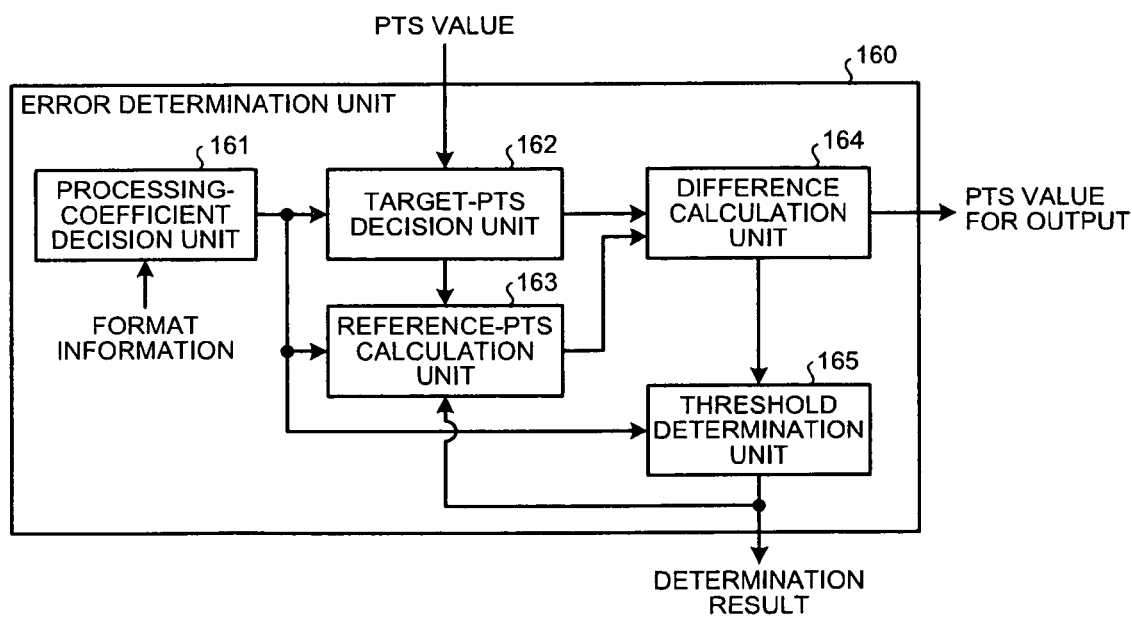
FIG. 2 is a block diagram representing an internal configuration of an error determination unit according to the first embodiment.

FIG. 2 is a block diagram representing an internal configuration of the error determination unit 160 according to the first embodiment. The error determination unit 160 represented in FIG. 2 includes a processing-coefficient decision unit 161, a target-PTS decision unit 162, a reference-PTS calculation unit 163, a difference calculation unit 164, and a threshold determination unit 165.

The processing-coefficient decision unit 161 decides a processing coefficient used for performing a determination process for the continuity of pictures based on format information for the stream. More specifically, the processing-coefficient decision unit 161 decides a processing coefficient using the format information, for example, as represented in FIG. 3. FIG. 3 represents two parameters (i.e., "num_units_in_tick" and "time_scale") corresponding to each format when a stream is based on an AVC (Advanced Video Coding)/H.264 system. As represented in FIG. 3, for example, if "num_units_in_tick" is 1001 and "time_scale" is 60000, it is understood that the format of the stream is an interlace format with a scanning frequency of 59.94 Hz (hereinafter, "59.94 Hz: interlace format". The other formats are also described in this manner.).

The processing-coefficient decision unit 161, when the format of the stream is identified, decides a processing coefficient suitable for a PTS value per picture in each of the formats. FIG. 4 represents a PTS value per picture corresponding to each of the formats. The PTS value represented in FIG. 4 is represented at a frequency of 90 Hz according to H.222 standard. As represented in FIG. 4, while the PTS value per picture is an integer in any format other than "59.94 Hz: progressive format", the PTS value per picture in the "59.94 Hz: progressive format" is "1501.5", which includes a number after the decimal point. Therefore, the processing-coefficient decision unit 161, when the format of the stream is "59.94 Hz: progressive format", decides 2 as the processing coefficient by which a product obtained by multiplying the PTS value per picture becomes an integer. More specifically, because if "1501.5" is multiplied by 2, the obtained product becomes 3003 being an integer, the processing-coefficient decision unit 161 decides 2 as the processing coefficient. If the format of the stream corresponds to any other case, the processing-coefficient decision unit 161 sets the processing coefficient to 1.

As explained above, the processing-coefficient decision unit 161 decides the value as the processing coefficient by which the product obtained by multiplying the PTS value per picture becomes an integer, so that all the determinations for the continuity of pictures can be processed by using the integer, and thus, the throughput can be reduced. Here, because the PTS value per picture in the "59.94 Hz: progressive format" is "1501.5", the processing coefficient becomes 2. However, when the format of the stream is a format in which the PTS value per picture is, for example, "1501.1", by multiplying the PTS value by 10, the product becomes an integer, and thus, the processing coefficient is set to 10. Furthermore, although there is not one value by which the product obtained by multiplying the PTS value per picture becomes an integer, it is desirable in terms of the throughput that a minimum value of integer values satisfying conditions be set as a processing coefficient. The processing-coefficient decision unit 161 outputs the decided processing coefficient to the target-PTS decision unit 162, the reference-PTS calculation unit 163, and the threshold determination unit 165.

The target-PTS decision unit 162, when the PTS value for each picture is received from the decoding unit 150, multiplies the received PTS value by the processing coefficient, to decide the PTS value as a target PTS used to determine the continuity of pictures. More specifically, for example, when the format of the stream is the "59.94 Hz: progressive format" and if the received PTS value is 10000, then the target-PTS decision unit 162 multiplies 1501 by 2 as the processing coefficient and decides 20000 as the target PTS.

Here, because the PTS value is generally rounded to an integer and added to each of the individual pictures, if the PTS value per picture contains a number after the decimal point as represented in "59.94 Hz: progressive format", an increment of the PTS value added to the picture is changed at a predetermined period, to thereby control the increments of the PTS values as a whole stream. More specifically, for example, in the "59.94 Hz: progressive format", each PTS value obtained by alternately adding "1501" and "1502" to the PTS value of the last picture is added to the picture, to control so that the PTS value per picture becomes "1501.5" as a whole stream.

Therefore, in the case of the "59.94 Hz: progressive format", the PTS value input to the target-PTS decision unit 162, if no error occurs, increases by "1501" or "1502" from the PTS value added to the last picture. However, when it is determined that there is no error if a difference between the PTS value and the PTS value of the last picture is simply either one of the values, it is not possible to detect an error that may occur in the case where the increment of the PTS value continuously increases by "1501" (or "1502") without a change in the increment of the PTS value.

Because of the assumption of the above-mentioned conditions, in the first embodiment, a simple determination is not made as to whether a difference between the PTS value added to the last picture and the PTS value added to the current picture coincides with a predetermined value. Moreover, in the first embodiment, because the value used for determination is converted to an integer to reduce the throughput, the target-PTS decision unit 162 multiplies the PTS value added to the current picture by the processing coefficient to determine a target PTS. In addition, the target-PTS decision unit 162, when the PTS value added to a first picture of each stream is received or when the PTS value is required from the reference-PTS calculation unit 163, outputs the target PTS determined from the received PTS value to the reference-PTS calculation unit 163.

The reference-PTS calculation unit 163 sets the target PTS output from the target-PTS decision unit 162 as an initial value of the reference PTS, sequentially adds a corresponding increment to the PTS value per picture, and calculates the reference PTS that is compared with the target PTS. More specifically, the reference-PTS calculation unit 163 sequentially adds a value, obtained by multiplying the PTS value per picture corresponding to the format by the processing coefficient, to the initial value of the reference PTS, and calculates the reference PTS. Therefore, in the case of, for example, "59.94 Hz: progressive format", if 20000 as the target PTS is output from the target-PTS decision unit 162, the reference-PTS calculation unit 163 sequentially adds 3003 (=1501.5×2) to 20000 as the initial value, and calculates reference PTSs such as 23003, 26006, . . . .

Moreover, the reference-PTS calculation unit 163, when the determination result that there is an error is notified from the threshold determination unit 165, requests the target-PTS decision unit 162 to output the target PTS, and sets the reference PTS as the target PTS and initializes the reference PTS. In this manner, when an error occurs, by initializing the reference PTS, determination as to whether there is an error can be again made from the picture right after the occurrence of the error.

The difference calculation unit 164 calculates a difference between the target PTS decided by the target-PTS decision unit 162 and the reference PTS calculated by the reference-PTS calculation unit 163, and outputs an absolute value of the difference to the threshold determination unit 165. Moreover, the difference calculation unit 164 outputs the PTS value for output used to decide an output timing at the time of displaying the picture to the image output unit 170. More specifically, the difference calculation unit 164 outputs the same value, being the PTS value for output, as the PTS value input to the target-PTS decision unit 162, to the image output unit 170. Therefore, the difference calculation unit 164 may output a value obtained by dividing the target PTS by the processing coefficient as the PTS value for output, and may output the PTS value input to the target-PTS decision unit 162 as it is as the PTS value for output.

The threshold determination unit 165 compares the absolute value of the difference calculated by the difference calculation unit 164 with the processing coefficient being a threshold, and determines whether the absolute value of the difference is less than the processing coefficient. The threshold determination unit 165, if the absolute value of the difference is less than the processing coefficient, notifies a control unit such as a CPU (not illustrated) of a determination result that there is no error, while notifies, if the absolute value of the difference is equal to or more than the processing coefficient, the control unit such as the CPU (not illustrated) and the reference-PTS calculation unit 163 of a determination result that there is an error.

Here, the reason why the processing coefficient becomes the threshold is explained. As explained above, even if the PTS value per picture contains a number after the decimal point, the PTS values added to the individual pictures are generally an integer. Each increment of the PTS values added to the individual pictures is an integer of which difference from the PTS value per picture is less than 1. In other words, the absolute value of a difference between the increment of the PTS value added to each of the individual pictures and the PTS value per picture is always less than 1. A specific example is given below. In the case of "59.94 Hz: progressive format", the PTS value per picture is "1501.5", and each increment of the PTS values added to the individual pictures becomes "1501" or "1502", and thus, the absolute value of the difference becomes 0.5.

At this time, in the first embodiment, because the PTS value is multiplied by the processing coefficient, a condition that the absolute value of the difference of the original PTS value becomes less than 1 is equivalent to a condition that the absolute value of the difference of the PTS value obtained by being multiplied by the processing coefficient becomes less than the processing coefficient. Therefore, the threshold determination unit 165 determines whether the absolute value of the difference between the target PTS and the reference PTS is less than the processing coefficient, and detects whether there is an error.

Moreover, the first embodiment is configured not to determine the PTS value added to the current picture with reference to the PTS value added to the last picture, but to determine the target PTS corresponding to the current picture by comparing the target PTS with the reference PTS obtained by sequentially adding the PTS value per picture to the initialized reference PTS. Therefore, for example, in the "59.94 Hz: progressive format", even if each increment of the PTS values added to the individual pictures is "1501" and is continued two times or more, an error can be detected. More specifically, if the PTS values added to the individual pictures increase in such a manner as, for example, 0, 1501, and 3002, the target PTSs become 0, 3002, and 6004, which are obtained by multiplying these PTS values by 2, respectively. Meanwhile, because the reference PTSs become 0, 3003, and 6006, for a third picture, an absolute value of the difference between the target PTS and the reference PTS becomes 2 or more, and thus, occurrence of an error can be detected.

Figure 5:
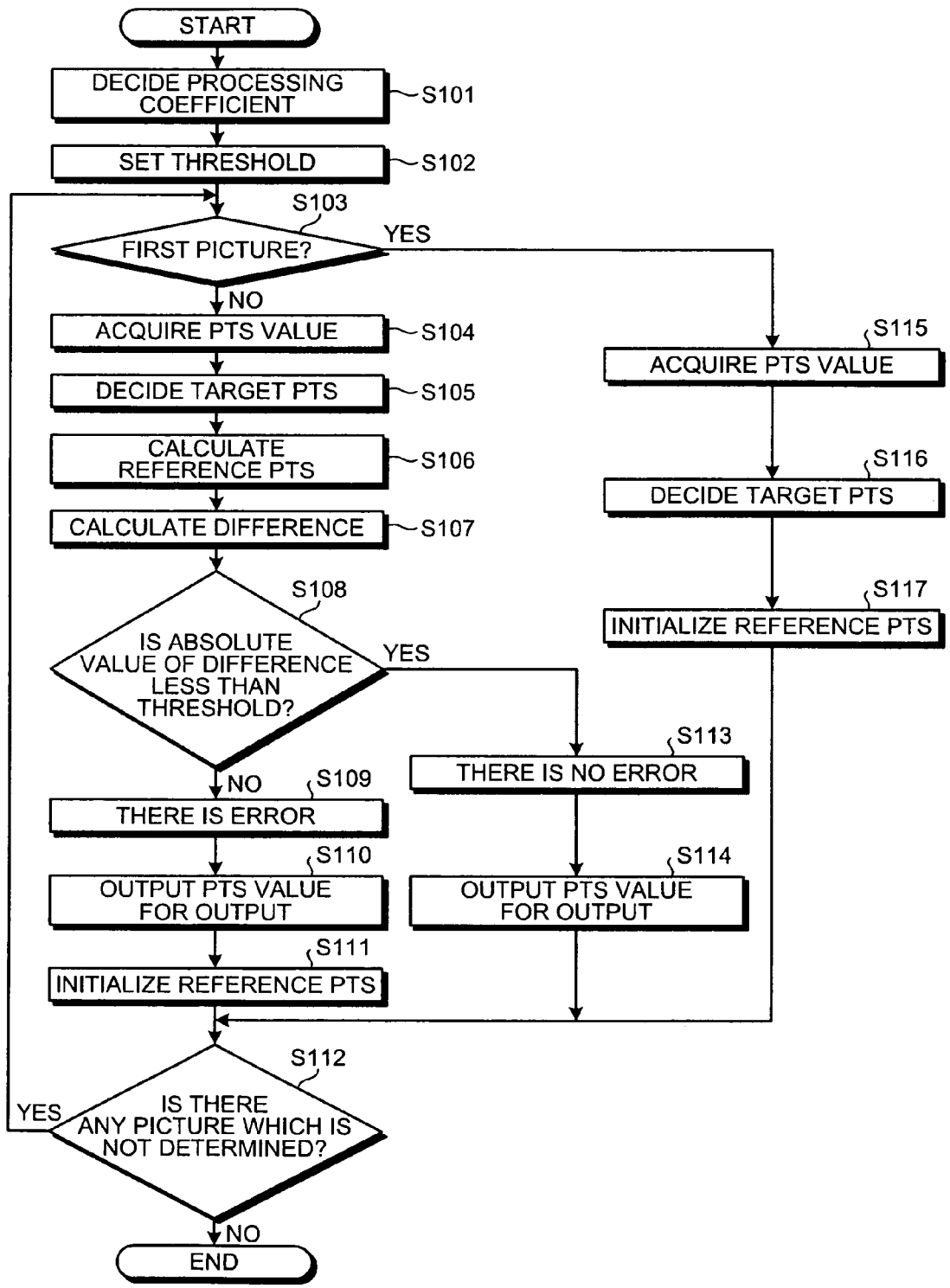
FIG. 5 is a flowchart representing an error determination process according to the first embodiment.

Next, the error determination process performed by the error determination unit 160 configured in the above manner will be explained with reference to the flowchart represented in FIG. 5. In the following, the explanation is made by exemplifying the case in which the format of the stream is "59.94 Hz: progressive format" unless otherwise specified.

First, a processing coefficient is decided from format information by the processing-coefficient decision unit 161 (Step S101). More specifically, for example, the two parameters in the stream (i.e., "num_units_in_tick" and "time_scale") represented in FIG. 3 are referred to by the processing-coefficient decision unit 161, and a format of the stream is identified from the values of the parameters.

Then, the processing coefficient suitable for a PTS value per picture for each format in FIG. 4 is decided by the processing-coefficient decision unit 161. Namely, a value by which a product obtained by multiplying the PTS value per picture becomes an integer is decided as a processing coefficient. Therefore, if the format of the stream is, for example, "59.94 Hz: progressive format", the processing coefficient becomes 2. It should be noted that the identification of the format may be performed by a processor other than the error determination unit 160. In this case, information for an already identified format is simply input to the processing-coefficient decision unit 161.

The processing coefficient decided by the processing-coefficient decision unit 161 is output to the target-PTS decision unit 162, the reference-PTS calculation unit 163, and the threshold determination unit 165. Then, a threshold to be compared afterward with the absolute value of the difference between the target PTS and the reference PTS is set as the processing coefficient by the threshold determination unit 165 (Step S102). Namely, if the processing coefficient is 2, then the threshold in the threshold determination unit 165 is also set to 2.

Meanwhile, the PTS values added to the pictures contained in the stream decoded by the decoding unit 150 are sequentially input to the target-PTS decision unit 162. When the PTS value is input, it is determined by the target-PTS decision unit 162 whether the input PTS value is the PTS value added to the first picture in the stream (Step S103).

As a result of determination, if the input PTS value is the PTS value added to the first picture (Yes at Step S103), the target-PTS decision unit 162 acquires the input PTS value (Step S115), multiplies the PTS value by the processing coefficient, and decides the target PTS (Step S116). The target PTS is output to the reference-PTS calculation unit 163, and the reference PTS in the reference-PTS calculation unit 163 is initialized (Step S117). The initialization of the reference PTS is a process for setting the target PTS output from the target-PTS decision unit 162 as an initial value of the reference PTS. Therefore, for the first picture, the difference between the target PTS and the reference PTS is 0, and this will not lead to a determination result that there is an error, and thus, the processes for calculating the difference and determining the threshold may be omitted.

Then, when the reference PTS is initialized, it is determined whether there is any picture of which a PTS value is not output from the decoding unit 150 to the error determination unit 160 and which is not determined whether there is an error (Step S112). If the error determination for all the pictures in the stream is completed (No at Step S112), then the process is ended. If there is a picture, in the stream, on which the error determination is not performed (Yes at Step S112), the PTS value added to the picture is again input to the target-PTS decision unit 162.

When the PTS value is again input thereto, it is determined by the target-PTS decision unit 162 whether the input PTS value is the PTS value added to the first picture in the stream (Step S103). Here, because the input PTS value is not the PTS value added to the first picture (No at Step S103), the target-PTS decision unit 162 acquires the input PTS value (Step S104), multiplies the PTS value by the processing coefficient, and decides the target PTS (Step S105). Further, the reference-PTS calculation unit 163 calculates the reference PTS (Step S106). More specifically, the value obtained by multiplying the PTS value per picture corresponding to the format by the processing coefficient is added to the last reference PTS held in the reference-PTS calculation unit 163, and a current reference PTS is calculated. For example, if the last reference PTS is "20000", then 3003 obtained by multiplying the PTS value "1501.5" per picture by 2 as the processing coefficient is added thereto, and the current reference PTS is calculated as "23003".

A difference between the target PTS decided by the target-PTS decision unit 162 and the reference PTS calculated by the reference-PTS calculation unit 163 is calculated by the difference calculation unit 164 (Step S107), and an absolute value of the calculated difference is output to the threshold determination unit 165. The absolute value of the difference is compared with the already set threshold (i.e., processing coefficient) in the threshold determination unit 165 (Step S108). As a result of comparison, if the absolute value of the difference is less than the processing coefficient (Yes at Step S108), it is determined that the PTS values added to the last picture and added to the current picture are values which are not contradictory as the PTS values added to the consecutive pictures. Therefore, the determination result that there is no error is output (Step S113).

A specific example is given below. If the current reference PTS is "23003" and if the target PTS is "23002" or "23004" (because the target PTS is obtained by multiplying the input PTS value by 2 as the processing coefficient, it is an even number), the absolute value of the difference between the reference PTS and the target PTS is less than 2 as the processing coefficient, and therefore the determination result that there is no error is output.

Because there is no error in the continuity of the pictures in the stream, the PTS value input to the target-PTS decision unit 162 is output to the image output unit 170 as the PTS value for output by the difference calculation unit 164 (Step S114). When the PTS value for output is output, the image output unit 170 compares the STC latched by the STC latch unit 140 with the PTS value for output at a timing of VSYNC, and outputs a picture corresponding to the PTS value for output which coincides with the STC to the display device such as a display (not illustrated). Thus, the pictures are displayed in the same order and at the same timing as these when the moving image is captured in the encoder device (not illustrated), and the moving image is reproduced.

The PTS value for output is output by the difference calculation unit 164, and at the same time it is determined whether there is any picture of which a PTS value is not output from the decoding unit 150 to the error determination unit 160 and which is not determined whether there is an error (Step S112). If the error determination for all the pictures in the stream is completed (No at Step S112), the process is ended. Furthermore, if there is a picture in the stream on which the error determination is not performed (Yes at Step S112), then the PTS value added to the picture is input again to the target-PTS decision unit 162.

Meanwhile, as a result of comparing the absolute value of the difference between the target PTS and the reference PTS with the processing coefficient, if the absolute value of the difference is equal to or more than the processing coefficient (No at Step S108), the PTS values added to the last picture and added to the current picture are contradictory values as PTS values added to the consecutive pictures, and therefore a determination result that there is an error is output (Step S109). A specific example is given below. If the current reference PTS is "23003" and if the target PTS is, for example, "100000", the absolute value of the difference between the reference PTS and the target PTS is 2 or more as the processing coefficient, and thus, a determination result that there is an error is output.

At this time, the determination result that there is an error is output to, for example, the control unit such as CPU (not illustrated), and the control unit performs a process for preventing a reproduction error of the moving image due to non-continuity of the pictures. More specifically, it may be configured that the control unit (not illustrated) performs a process such as requesting the encoder device (not illustrated) to retransmit the stream. To prevent interruption of reproduction of the moving image, it may be configured that even if the determination result is that there is an error, the difference calculation unit 164 outputs the PTS value input to the target-PTS decision unit 162 as the PTS value for output, to the image output unit 170 (Step S110).

However, when the PTS value for output is to be output, the error determination is newly implemented on the subsequent pictures, and thus, the reference PTS stored in the reference-PTS calculation unit 163 is initialized (Step S111). The initialization of the reference PTS is a process in which an output of the current target PTS is requested from the reference-PTS calculation unit 163 to the target-PTS decision unit 162 and the target PTS output from the target-PTS decision unit 162 is set as an initial value of the reference PTS. Therefore, in the above example, the reference PTS is changed from "23003" to "100000" and is initialized. Thus, for the subsequent pictures, the picture that has an error is set as the first picture and new error determination is started therefrom.

The PTS value for output is output by the difference calculation unit 164, and at the same time it is determined whether there is any picture of which a PTS value is not output from the decoding unit 150 to the error determination unit 160 and which is not determined whether there is an error (Step S112). If the error determination for all the pictures in the stream is completed (No at Step S112), the process is ended. Furthermore, if there is a picture in the stream on which the error determination is not performed (Yes at Step S112), then the PTS value added to the picture is input again to the target-PTS decision unit 162.

Next, a specific example of the error determination according to the first embodiment will be explained with reference to FIG. 6. FIG. 6 is a diagram representing PTS values added to pictures #1 to #5 that form a stream and an example of the results of error determination performed based on the PTS values. It should be noted that the stream represented in FIG. 6 is a stream of "59.94 Hz: progressive format". Namely, the PTS value per picture is "1501.5".

When the stream is decoded by the decoding unit 150 and the PTS value "10000" of the picture #1 is input to the target-PTS decision unit 162, the target-PTS decision unit 162 multiplies the PTS value "10000" by 2 as the processing coefficient and decides "20000" as the target PTS. Further, because the picture #1 is the first picture, the target PTS "20000" is output to the reference-PTS calculation unit 163, and the initial value of the reference PTS becomes "20000". As explained above, for the first picture, the difference between the target PTS and the reference PTS is 0, and thus, the determination result is inevitably "no error".

When the PTS value "50000" of the picture #2 is input to the target-PTS decision unit 162, the target-PTS decision unit 162 multiplies the PTS value "50000" by 2 as the processing coefficient and decides "100000" as the target PTS. The reference-PTS calculation unit 163 adds "3003" obtained by multiplying "1501.5" as the PTS value per picture by 2 as the processing coefficient to the held reference PTS "20000", and calculates the current reference PTS as "23003". Then, a difference "76997" between the target PTS and the reference PTS is calculated by the difference calculation unit 164 and an absolute value thereof is output to the threshold determination unit 165. In this case, because the absolute value of the difference is 2 or more as the processing coefficient, a determination result that there is an error is output from the threshold determination unit 165.

When the determination result that there is an error is output, an output of the target PTS is requested by the reference-PTS calculation unit 163, and the reference PTS is initialized by the target PTS "100000" output from the target-PTS decision unit 162. More specifically, the reference PTS stored in the reference-PTS calculation unit 163 is changed from "23003" to "100000".

When the PTS value "51501" of the picture #3 is input to the target-PTS decision unit 162, the target-PTS decision unit 162 multiplies the PTS value "51501" by 2 as the processing coefficient and decides "103002" as the target PTS. The reference-PTS calculation unit 163 adds "3003" to the stored reference PTS "100000", and calculates the current reference PTS as "103003". The difference calculation unit 164 calculates a difference "−1" between the target PTS and the reference PTS and outputs an absolute value thereof to the threshold determination unit 165. In this case, because the absolute value of the difference is less than 2 as the processing coefficient, a determination result that there is no error is output from the threshold determination unit 165.

In this manner, the reference PTS is initialized when the determination result for the picture #2 that there is an error is output. Thus, if an increment of the PTS value of the picture #3 is an appropriate value, a determination result for the picture #3 that there is an error will not be output. Likewise, for the pictures #4 and #5, increments of the PTS values to be added are "1502" and "1501" respectively, and, for the PTS values of the picture #3 and subsequent ones, an increment of 1501 and an increment of 1502 appear alternately, and thus, a determination result that there is no error will be output.

As explained above, according to the first embodiment, the threshold determination is performed on the absolute value of the difference between the target PTS based on the PTS value added to the picture and the reference PTS indicating the appropriate PTS value. Based on this, it is determined whether an increment of the PTS value added to each of consecutive pictures in the stream corresponds to the PTS value per picture according to the format of the stream, and it is determined whether the pictures in the stream are correctly consecutive. Therefore, it is possible to check the continuity of a plurality of pictures that form a moving image, determine whether there is an error in the stream, and prevent a reproduction error of the moving image in real time. Further, if the PTS value per picture according to the format of the stream contains a number after the decimal point, a processing coefficient according to the format is decided, and a value obtained by multiplying the PTS value by the processing coefficient is used to execute an error determination process, which allows reduction of the throughput.

[b] Second Embodiment

A feature of a second embodiment of the present invention is a point in that it is not determined that there is an error when the increment of the PTS value for one picture is not appropriate but it is determined that there is an error when increments of the PTS values for a plurality of pictures are not appropriate consecutively.

In the first embodiment, it is determined that there is an error when the absolute value of the difference between the target PTS and the reference PTS for one picture is the processing coefficient or more. However, only the PTS value added to one picture may be incidentally incorrect due to, for example, slight noise on a communication line. In such a case, in the first embodiment, it is determined that there is an error although the picture itself keeps continuity with the adjacent pictures, and these results in requiring some process for the error. Therefore, in the second embodiment, if the PTS values added to a plurality of pictures (e.g., two pieces) are consecutively incorrect, then it is determined that there is an error, so that the continuity of the pictures is more reliably determined.

Figure 7:
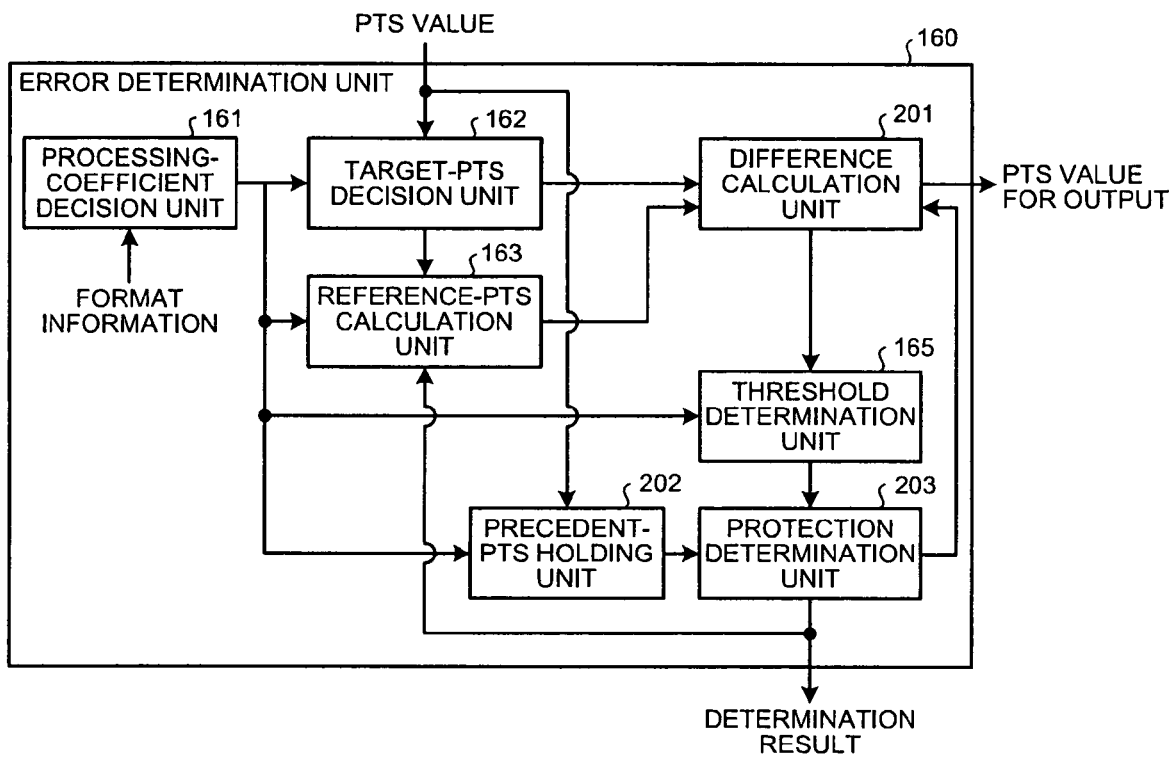
FIG. 7 is a block diagram representing an internal configuration of an error determination unit according to a second embodiment.

The main configuration of the decoder device according to the second embodiment is the same as that of the first embodiment, and thus, explanation thereof is omitted. However, in the second embodiment, an internal configuration of the error determination unit 160 is different from that of the first embodiment. FIG. 7 is a block diagram representing an internal configuration of the error determination unit 160 according to the second embodiment. In FIG. 7, the same numerals are assigned to components the same as these in FIG. 2, and explanation thereof is omitted. The error determination unit 160 represented in FIG. 7 includes the processing-coefficient decision unit 161, the target-PTS decision unit 162, the reference-PTS calculation unit 163, a difference calculation unit 201, a threshold determination unit 165, a precedent-PTS holding unit 202, and a protection determination unit 203.

The difference calculation unit 201 calculates a difference between the target PTS decided by the target-PTS decision unit 162 and the reference PTS calculated by the reference-PTS calculation unit 163, and outputs the absolute value of the difference to the threshold determination unit 165. Moreover, the difference calculation unit 201 outputs the PTS value for output used to decide an output timing at the time of displaying the picture to the image output unit 170. More specifically, the difference calculation unit 201, when it is notified from the protection determination unit 203 that the absolute value of the difference between the target PTS and the reference PTS is less than the processing coefficient and thus it is determined that there is no error, outputs the same value, being the PTS value for output, as the PTS value input to the target-PTS decision unit 162, to the image output unit 170. Likewise, the difference calculation unit 201, when it is notified from the protection determination unit 203 that it is determined that there is an error, outputs the same value, being the PTS value for output, as the PTS value input to the target-PTS decision unit 162 to the image output unit 170.

Furthermore, the difference calculation unit 201, when it is notified from the protection determination unit 203 that the number of protections is less than a predetermined set value and thus it is determined that there is no error even if the absolute value of the difference between the target PTS and the reference PTS is the processing coefficient or more, outputs a PTS value based on assumption that there is no error in the current picture to the image output unit 170, as the PTS value for output. More specifically, in the second embodiment, even if the absolute value of the difference between the target PTS and the reference PTS is the processing coefficient or more, it is not immediately determined that there is an error, but it is determined that there is no error until the number of consecutive times that the absolute value of the difference is the processing coefficient or more reaches a predetermined set value. Therefore, if it is determined that there is no error even if the absolute value of the difference is the processing coefficient or more, the difference calculation unit 201 outputs an appropriate PTS value as the PTS value for output, instead of the PTS value input to the target-PTS decision unit 162.

In order to calculate a value appropriate as a PTS value added to the next picture, the precedent-PTS holding unit 202 holds the value, as the precedent PTS, appropriate as the PTS value added to a picture precedent to the current picture. More specifically, the precedent-PTS holding unit 202 holds an appropriate PTS value capable of being added to a picture precedent to the current picture by the same number as the processing coefficient. Namely, the precedent-PTS holding unit 202, if the processing coefficient is 2, holds a value appropriate as the PTS value added to a picture before the last picture, as the precedent PTS.

More specifically, if the processing coefficient is 2, the precedent-PTS holding unit 202, when it is determined for the current picture that the absolute value of the difference between the target PTS and the reference PTS is less than the processing coefficient and there is therefore no error, updates the precedent PTS to the PTS value actually added to the last picture. Further, the precedent-PTS holding unit 202, when it is determined for the current picture that there is an error, initializes the precedent PTS by the PTS value actually added to the last picture. Furthermore, the precedent-PTS holding unit 202, when it is determined for the current picture that there is no error even if the absolute value of the difference between the target PTS and the reference PTS is the processing coefficient or more, updates the precedent PTS to the same value as the PTS value for output that is output to the last picture from the difference calculation unit 201. These are summarized as follows: the precedent-PTS holding unit 202 holds, as the precedent PTS, the PTS value for output that is output from the difference calculation unit 201 to a picture precedent by the same number as the processing coefficient from the current picture in processing.

The protection determination unit 203 refers to the result of threshold determination that is output from the threshold determination unit 165 to determine whether the number of consecutive times (or the number of protections) that the absolute value of the difference between the target PTS and the reference PTS is the processing coefficient or more, reaches a predetermined set value. Then, the protection determination unit 203 outputs a determination result that there is an error when the number of protections reaches the predetermined set value, while outputs a determination result that there is no error when the number of protections does not reach the predetermined set value.

The protection determination unit 203 outputs the precedent PTS held by the precedent-PTS holding unit 202 to the difference calculation unit 201 when the determination result that there is no error is output although the absolute value of the difference between the target PTS and the reference PTS is the processing coefficient or more.

Figure 8:
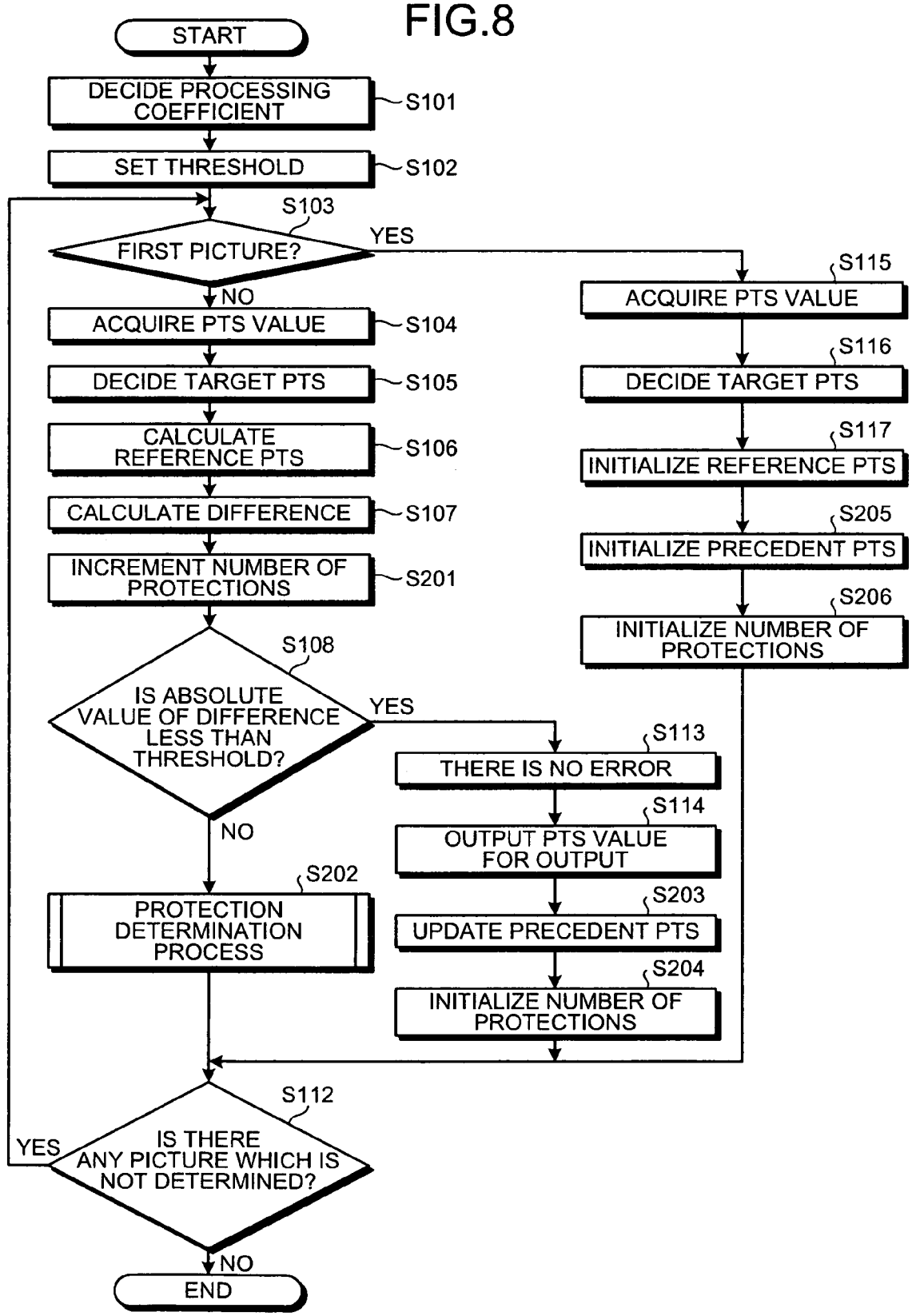
FIG. 8 is a flowchart representing an error determination process according to the second embodiment.

Next, the error determination process performed by the error determination unit 160 configured in the above manner will be explained with reference to the flowchart represented in FIG. 8. In FIG. 8, the same numerals are assigned to portions the same as these of FIG. 5, and detailed explanation thereof is omitted. In the following, the explanation will be made by exemplifying the case where the format of the stream is "59.94 Hz: progressive format", unless otherwise specified.

First, the processing coefficient is decided from the format information by the processing-coefficient decision unit 161 (Step S101). The processing coefficient decided by the processing-coefficient decision unit 161 is output to the target-PTS decision unit 162, the reference-PTS calculation unit 163, and the threshold determination unit 165. Then, a threshold to be compared afterward with the absolute value of the difference between the target PTS and the reference PTS is set as the processing coefficient by the threshold determination unit 165 (Step S102).

Meanwhile, the PTS values added to the pictures contained in the stream decoded by the decoding unit 150 are sequentially input to the target-PTS decision unit 162. When the PTS value is input, it is determined by the target-PTS decision unit 162 whether the input PTS value is the PTS value added to the first picture in the stream (Step S103).

As a result of determination, if the input PTS value is the PTS value added to the first picture (Yes at Step S103), the target-PTS decision unit 162 acquires the input PTS value (Step S115), multiplies the PTS value by the processing coefficient, and decides the target PTS (Step S116). The target PTS is output to the reference-PTS calculation unit 163, and the reference PTS in the reference-PTS calculation unit 163 is initialized (Step S117).

The PTS value output from the decoding unit 150 is also input to the precedent-PTS holding unit 202, where the precedent PTS is initialized (Step S205). The initialization of the precedent PTS is a process for determining a value appropriate as the PTS value added to a picture precedent by the same number as the processing coefficient with respect to the next picture based on the PTS value of the input current picture, and setting the value as an initial value of the precedent PTS. Therefore, for example, if the processing coefficient is 2 and the PTS value added to the first picture is "10000", "8498" (or "8499") obtained by subtracting 1502 (or 1501) from the PTS value is set as the initial value of the precedent PTS. Because the PTS value of the current picture is "10000", if the PTS value of the next picture is "11501", the precedent PTS "8498" is appropriate as the PTS value added to a picture before the last picture with respect to the next picture. At the same time, the number of protections is initialized to 0 in the protection determination unit 203 (Step S206).

Then, when the reference PTS, the precedent PTS, and the number of protections are initialized, it is determined whether there is any picture of which a PTS value is not output from the decoding unit 150 to the error determination unit 160 and which is not determined whether there is an error (Step S112). If the error determination for all the pictures in the stream is completed (No at Step S112), then the process is ended. If there is a picture in the stream on which the error determination is not performed (Yes at Step S112), the PTS value added to the picture is again input to the target-PTS decision unit 162.

When the PTS value is again input thereto, it is determined by the target-PTS decision unit 162 whether the input PTS value is the PTS value added to the first picture in the stream (Step S103). Here, because the input PTS value is not the PTS value added to the first picture (No at Step S103), the target-PTS decision unit 162 acquires the input PTS value (Step S104), multiplies the PTS value by the processing coefficient, and decides the target PTS (Step S105). Further, the reference-PTS calculation unit 163 calculates the reference PTS (Step S106).

A difference between the target PTS decided by the target-PTS decision unit 162 and the reference PTS calculated by the reference-PTS calculation unit 163 is calculated by the difference calculation unit 201 (Step S107), and the absolute value of the calculated difference is output to the threshold determination unit 165. In the second embodiment, at this time, the number of protections in the protection determination unit 203 is incremented by one (Step S201). Further, the absolute value of the difference is compared with the already set threshold (i.e., processing coefficient) in the threshold determination unit 165 (Step S108). As a result of comparison, if the absolute value of the difference is less than the processing coefficient (Yes at Step S108), a determination result that there is no error is output (Step S113).

Because there is no error in the continuity of the pictures in the stream, the PTS value input to the target-PTS decision unit 162 is output to the image output unit 170 as the PTS value for output by the difference calculation unit 201 (Step S114). In the precedent-PTS holding unit 202, the precedent PTS is updated to the PTS value for output that is output to the last picture from the difference calculation unit 201 (Step S203). More specifically, for example, when the PTS value "10000" of the picture is output, as the PTS value for output, from the difference calculation unit 201 and the PTS value for output for its subsequent picture is output from the difference calculation unit 201, the precedent PTS is updated from "8498" as the initial value to "10000". Therefore, the precedent PTS, when the PTS value for output for a certain picture is to be output, is updated from the PTS value for output for a picture precedent from the picture by the same number as the processing coefficient to the PTS value for output for a picture right after the precedent picture. At the same time, the number of protections held in the protection determination unit 203 is initialized to 0 (Step S204).

The PTS value for output is output by the difference calculation unit 201, and at the same time it is determined whether there is any picture of which a PTS value is not output from the decoding unit 150 to the error determination unit 160 and which is not determined whether there is an error (Step S112). If the error determination for all the pictures in the stream is completed (No at Step S112), the process is ended. Furthermore, if there is a picture in the stream on which the error determination is not performed (Yes at Step S112), then the PTS value added to the picture is input again to the target-PTS decision unit 162.

Meanwhile, as a result of comparing the absolute value of the difference between the target PTS and the reference PTS with the processing coefficient, if the absolute value of the difference is equal to or more than the processing coefficient (No at Step S108), then a protection determination process is performed by the protection determination unit 203 (Step S202). The protection determination process will be explained in detailed later. Upon completion of the protection determination process, it is determined whether there is any picture of which a PTS value is not output from the decoding unit 150 to the error determination unit 160 and which is not determined whether there is an error (Step S112). If the error determination for all the pictures in the stream is completed (No at Step S112), the process is ended. Furthermore, if there is a picture in the stream on which the error determination is not performed (Yes at Step S112), then the PTS value added to the picture is input again to the target-PTS decision unit 162.

Figure 9:
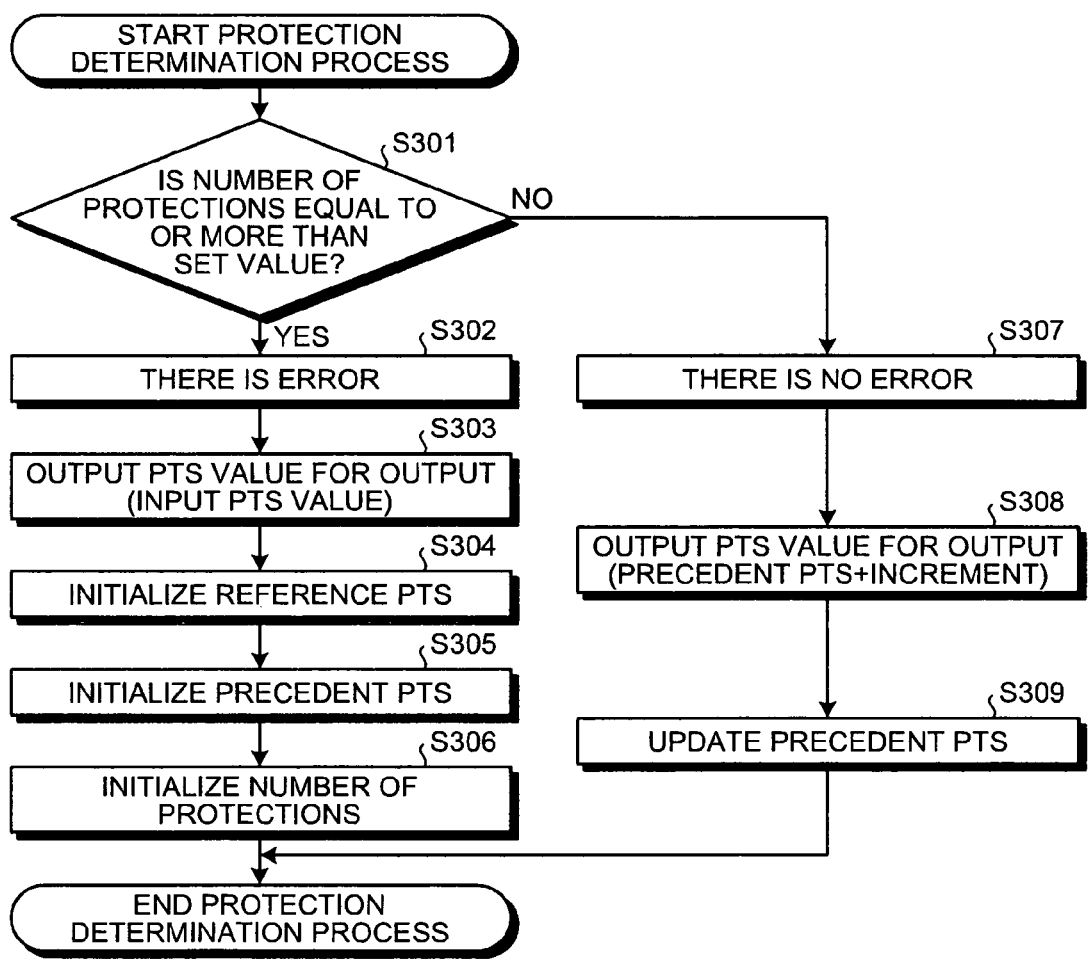
FIG. 9 is a flowchart representing a protection determination process according to the second embodiment.

Next, the protection determination process according to the second embodiment will be explained with reference to the flowchart represented in FIG. 9.

Previously stored in the protection determination unit 203 is a set value indicating the upper limit of the number of protections. The set value is an integer of 2 or more. If pictures each in which an absolute value of the difference between the target PTS and the reference PTS is equal to or more than the processing coefficient are consecutive by the same number as the set value, it is determined that there is an error in the stream. Therefore, in the protection determination process, if the absolute value of the difference between the target PTS and the reference PTS is equal to or more than the processing coefficient as a result of threshold determination in the threshold determination unit 165, it is determined by the protection determination unit 203 whether the number of protections becomes the set value or more (Step S301).

As a result of the determination, if the number of protections becomes the set value or more (Yes at Step S301), a determination result that there is an error is output by the protection determination unit 203 (Step S302). The determination result that there is an error is output to, for example, a control unit such as CPU (not illustrated), and the control unit performs a process for preventing a reproduction error of the moving image due to discontinuity of pictures. More specifically, in order to prevent reproduction of the moving image from being interrupted, it may be configured so that the PTS value input to the target-PTS decision unit 162 is output to the image output unit 170 as the PTS value for output by the difference calculation unit 201 even if the determination result is that there is an error (Step S303).

However, when the PTS value for output is to be output, the error determination is again performed on the subsequent pictures, and therefore the reference PTS held in the reference-PTS calculation unit 163 is initialized (Step S304). The initialization of the reference PTS is a process in which an output of the current target PTS is requested from the reference-PTS calculation unit 163 to the target-PTS decision unit 162 and the target PTS output from the target-PTS decision unit 162 is set as an initial value of the reference PTS. Likewise, the precedent PTS held in the precedent-PTS holding unit 202 is initialized (Step S305). The initialization of the precedent PTS is a process for determining a value appropriate as the PTS value added to a picture precedent by the same number as the processing coefficient with respect to the next picture based on the PTS value of the input current picture, and setting the value as an initial value of the precedent PTS. Further, to again perform the error determination, the number of protections held in the protection determination unit 203 is initialized to 0 (Step S306).

Meanwhile, if the number of protections is less than the set value (No at Step S301), a determination result that there is no error is output by the protection determination unit 203 (Step S307). However, in this case, the determination result that there is no error is output although the absolute value of the difference between the target PTS and the reference PTS is equal to or more than the processing coefficient. This is because the PTS value added to the current picture is not appropriate, and thus, it is inadequate to determine the PTS value input to the target-PTS decision unit 162 as the PTS value for output. Therefore, a precedent PTS is acquired from the precedent-PTS holding unit 202 by the protection determination unit 203, and is output together with the determination result to the difference calculation unit 201. At this time, the precedent PTS held in the precedent-PTS holding unit 202 is the precedent PTS before being updated, and therefore, this is equivalent to the PTS value added (or capable of being added) to a picture precedent by the same number as the processing coefficient. Then, a value obtained by multiplying the PTS value per picture by the processing coefficient is added to the precedent PTS by the difference calculation unit 201, and the obtained value as the PTS value for output is output to the image output unit 170 (Step S308).

As explained above, in the second embodiment, when the number of protections is less than the set value, even if the PTS value added to the current picture is a value negating the continuity of pictures, an appropriate PTS value satisfying the continuity of the pictures is calculated and the calculated value is set as a PTS value for output. Therefore, even if the PTS value added to the current picture is incidentally incorrect, the PTS value for output for determining a display timing of the picture is corrected to an appropriate value, so that the reproduction error of the moving image can be prevented.

After the PTS value for output is calculated based on the precedent PTS and is output, in the precedent-PTS holding unit 202, the precedent PTS is updated to a value the same as the PTS value for output for a picture precedent by a number smaller than the processing coefficient by 1 (Step S309). Thus, for the precedent PTS, influence of the incidentally incorrect PTS value can be removed, and the error determination and display can be appropriately performed on the subsequent pictures.

Next, specific examples of the error determination according to the second embodiment will be explained with reference to FIG. 10 and FIG. 11. FIG. 10 and FIG. 11 are diagrams representing PTS values added to the pictures #1 to #5 that form a stream and examples of the results of the error determination performed based on the PTS values. The streams represented in FIG. 10 and FIG. 11 are the "59.94 Hz: progressive format" stream. Namely, the PTS value per picture is "1501.5". In the following explanation, the set value being set in the protection determination unit 203 is 2. In other words, if the absolute value of the difference between the target PTS and the reference PTS becomes equal to or more than the processing coefficient twice in series, it is determined that there is an error.

First, a first specific example will be explained below with reference to FIG. 10. When the stream is decoded by the decoding unit 150 and the PTS value "10000" of the picture #1 is input to the target-PTS decision unit 162, the target-PTS decision unit 162 multiplies the PTS value "10000" by 2 as the processing coefficient and decides the target PTS as "20000". At this time, the PTS value "10000" is also input to the precedent-PTS holding unit 202, and the precedent PTS is initialized to a PTS value capable of being added to a picture right before the picture #1 by the precedent-PTS holding unit 202. More specifically, the increment "1502" of the PTS value added to the picture is subtracted from the PTS value "10000", and the initial value "8498" of the obtained precedent PTS is held. Further, because the picture #1 is the first picture, the target PTS "20000" is output to the reference-PTS calculation unit 163, and the initial value of the reference PTS becomes "20000". As explained above, for the first picture, the difference between the target PTS and the reference PTS is 0, and thus, the determination result is inevitably "no error".

When the PTS value "50000" of the picture #2 is input to the target-PTS decision unit 162, the target-PTS decision unit 162 multiplies the PTS value "50000" by 2 as the processing coefficient and decides "100000" as the target PTS. Further, the reference-PTS calculation unit 163 adds "3003" obtained by multiplying "1501.5" as the PTS value per picture by 2 as the processing coefficient to the held reference PTS "20000", and calculates the current reference PTS as "23003". Then, a difference "76997" between the target PTS and the reference PTS is calculated by the difference calculation unit 201 and the absolute value thereof is output to the threshold determination unit 165, and the number of protections in the protection determination unit 203 is incremented by one to become "1". In this case, because the absolute value of the difference is 2 or more as the processing coefficient, that effect is notified to the protection determination unit 203.

In the protection determination unit 203, although the absolute value of the difference is 2 or more as the processing coefficient, the number of protections "1" is less than 2 as the set value, and thus, a determination result that there is no error is output. The precedent PTS "8498" is acquired from the precedent-PTS holding unit 202 by the protection determination unit 203, and is output to the difference calculation unit 201. The difference calculation unit 201 outputs a value "11501" obtained by adding "3003" that is obtained by multiplying the PTS value per picture by 2 as the processing coefficient to the precedent PTS "8498" instead of the PTS value "50000" input to the target-PTS decision unit 162, to the image output unit 170 as the PTS value for output. Thus, a display timing of the picture #2 is not a timing in which STC in the STC counter unit 130 coincides with the PTS value "50000" actually added to the picture #2 but is a timing in which STC coincides with the PTS value for output "11501".

When the PTS value for output "11501" is output from the difference calculation unit 201, in the precedent-PTS holding unit 202, the precedent PTS is updated to "10000" output from the difference calculation unit 201 as the PTS value for output of the last picture #1. It should be noted that in order to prepare for update of the precedent PTS upon output of the PTS value for output to the picture #3, the PTS value for output "11501" for the picture #2 is held in a memory or the like (not illustrated).

When a PTS value "13003" of the picture #3 is input to the target-PTS decision unit 162, the target-PTS decision unit 162 multiplies the PTS value "13003" by 2 as the processing coefficient and decides "26006" as the target PTS. Further, the reference-PTS calculation unit 163 adds "3003" obtained by multiplying "1501.5" as the PTS value per picture by 2 as the processing coefficient to the held reference PTS "23003", and calculates the current reference PTS as "26006". Then, a difference "0" between the target PTS and the reference PTS is calculated by the difference calculation unit 201 and the absolute value thereof is output to the threshold determination unit 165, and the number of protections in the protection determination unit 203 is incremented by one to become "2". In this case, because the absolute value of the difference is less than 2 as the processing coefficient, a determination result is that there is no error, and the PTS value "13003" is output from the difference calculation unit 201 as the PTS value for output. In the precedent-PTS holding unit 202, the precedent PTS is updated to "11501" as the PTS value for output for the picture #2, and the number of protections in the protection determination unit 203 is initialized to 0.

In the first example, because PTS values for the pictures #4 and #5 are also appropriate values, the absolute value of the difference between the target PTS and the reference PTS is less than 2 as the processing coefficient, and thus, determination results that there is an error in the pictures #1 through #5 are not output although the PTS value added to the picture #2 is inappropriate.

Next, a second specific example will be explained with reference to FIG. 11. In the second specific example, only PTS values added to the picture #3 and the subsequent pictures are different from the first specific example, and thus, a process after the process for inputting the PTS value "51501" of the picture #3 to the target-PTS decision unit 162 will be explained below.

When the PTS value "51501" of the picture #3 is input to the target-PTS decision unit 162, the target-PTS decision unit 162 multiplies the PTS value "51501" by 2 as the processing coefficient and decides "103002" as the target PTS. Further, the reference-PTS calculation unit 163 adds "3003" obtained by multiplying "1501.5" as the PTS value per picture by 2 as the processing coefficient to the held reference PTS "23003", and calculates the current reference PTS as "26006". Then, a difference "76996" between the target PTS and the reference PTS is calculated by the difference calculation unit 201 and the absolute value thereof is output to the threshold determination unit 165, and the number of protections in the protection determination unit 203 is incremented by one to become "2". In this case, because the absolute value of the difference is 2 or more as the processing coefficient, that effect is notified to the protection determination unit 203.

In the protection determination unit 203, the absolute value of the difference is 2 or more as the processing coefficient and the number of protections "2" is equal to or more than 2 as the set value, and thus, a determination result that there is an error is output. The PTS value "51501" is output from the difference calculation unit 201 as the PTS value for output, and in the precedent-PTS holding unit 202, the precedent PTS is initialized. More specifically, a value "50000" appropriate as the PTS value added to the last picture #2 is determined from "51501" as the PTS value for output for the current picture #3 and is set as an initial value of the precedent PTS. At the same time, the reference PTS is initialized to "103002" the same as the target PTS, and the number of protections in the protection determination unit 203 is initialized to 0.

In this manner, in the second example, the absolute values of the difference between the target PTS and the reference PTS are equal to or more than 2 as the processing coefficient consecutively in the two pictures: pictures #2 and #3, and thus, it is determined that there is an error, and after the determination that there is an error, the reference PTS, the precedent PTS, and the number of protections are initialized so that the error determination can be performed again.

As explained above, according to the second embodiment, the threshold determination is performed on the absolute value of the difference between the target PTS based on the PTS value added to the picture and the reference PTS indicating the appropriate PTS value. Based on this, it is determined whether an increment of the PTS value added to consecutive pictures in the stream corresponds to the PTS value per picture according to the format of the stream, and it is determined whether the pictures in the stream are correctly consecutive. If the result that the pictures are not consecutive is continued predetermined times, it is determined that there is an error in the stream. Therefore, it is possible to reliably detect an error in the stream by removing an incidental error of the PTS value and to prevent a reproduction error of the moving image in real time.

It should be noted that it is possible to generate an error determination program in which the error determination methods explained in the respective embodiments are described in a computer-readable format and cause a computer to execute the error determination program, so that the computer can be also caused to execute the error determination methods according to the embodiments.

According to the present invention, it is possible to determine whether there is an error in the stream containing a plurality of pictures that compose a moving image and to prevent a reproduction error of the moving image in real time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An error determination device for determining whether there is an error in a moving image composed of a plurality of pictures each to which time information indicating a display time is added, the error determination device comprising:
   an acquisition unit for acquiring target time information for each picture corresponding to the display time indicated by the time information added to each of the pictures;
   a calculation unit for calculating reference time information for each picture corresponding to a normal display time that increases by a fixed display time per picture from an initial value; and
   a determination unit for determining whether a plurality of pictures are consecutive by comparing an absolute value of a difference between target time information and reference time information for each picture with a threshold.

2. The error determination device according to claim 1, further comprising a decision unit for deciding a processing coefficient based on a format of the moving image, wherein
   the acquisition unit determines target time information by multiplying a display time by the processing coefficient decided by the decision unit, and
   the calculation unit determines reference time information by multiplying the normal display time by the processing coefficient decided by the decision unit.

3. The error determination device according to claim 2, wherein the decision unit decides a minimum value, of integer values, as a processing coefficient by which a product obtained by multiplying a display time per picture corresponding to the format of the moving image becomes an integer.

4. The error determination device according to claim 2, wherein the determination unit determines whether the plurality of pictures are consecutive based on the processing coefficient decided by the decision unit as a threshold.

5. The error determination device according to claim 1, wherein the determination unit, when the absolute value of the difference between the target time information and the reference time information for each picture is the threshold or more, determines that the plurality of pictures are not consecutive.

6. The error determination device according to claim 1, wherein the determination unit, when pictures each in which the absolute value of the difference between the target time information and the reference time information is the threshold or more are consecutive by a number equal to or more than a predetermined number, determines that the plurality of pictures are not consecutive.

7. The error determination device according to claim 1, further comprising an output unit for outputting the display time indicated by the time information added to each picture, as a real display time at which the picture is actually displayed.

8. The error determination device according to claim 7, wherein the output unit, when pictures each in which the absolute value of the difference between the target time information and the reference time information is the threshold or more are consecutive by a number less than the predetermined number, outputs a real display time determined from a real display time of a precedent picture, instead of the display time indicated by the time information added to the picture.

9. The error determination device according to claim 1, wherein the calculation unit calculates reference time information based on a display time, as an initial value, indicated by time information added to an initial picture of the moving image.

10. The error determination device according to claim 1, wherein the calculation unit calculates reference time information based on a display time, as an initial value, indicated by time information added to a picture corresponding to the time of the determination after it is determined by the determination unit that the plurality of pictures are not consecutive.

11. An error determination method for determining whether there is an error in a moving image composed of a plurality of pictures each to which time information indicating a display time is added, the error determination device comprising:
   acquiring target time information for each picture corresponding to the display time indicated by the time information added to each of the pictures;
   calculating reference time information for each picture corresponding to a normal display time that increases by a fixed display time per picture from an initial value; and determining whether a plurality of pictures are consecutive by comparing an absolute value of a difference between target time information and reference time information for each picture with a threshold.

12. A non-transitory computer readable storage medium having stored therein an error determination program for determining whether there is an error in a moving image composed of a plurality of pictures each to which time information indicating a display time is added, the error determination program causing a computer to execute a process comprising:

acquiring target time information for each picture corresponding to the display time indicated by the time information added to each of the pictures;

calculating reference time information for each picture corresponding to a normal display time that increases by a fixed display time per picture from an initial value; and determining whether a plurality of pictures are consecutive by comparing an absolute value of a difference between target time information and reference time information for each picture with a threshold.

\* \* \* \* \*